United States Patent [19]

Olson et al.

[11] 4,412,898
[45] Nov. 1, 1983

[54] PROCESS FOR CHLORINATION OF PVC IN WATER WITHOUT USE OF SWELLING AGENTS

[75] Inventors: Alan J. Olson, Westlake; Robert G. Vielhaber, Doylestown, both of Ohio

[73] Assignee: The B.F. Goodrich Company, Akron, Ohio

[21] Appl. No.: 350,982

[22] Filed: Feb. 22, 1982

Related U.S. Application Data

[63] Continuation-in-part of Ser. No. 181,521, Aug. 26, 1980, abandoned.

[51] Int. Cl.$^3$ .................................................. C08F 8/18
[52] U.S. Cl. ................................ 204/159.18; 525/358; 525/331.6
[58] Field of Search ........................ 525/358, 331.6; 204/159.18

[56] References Cited

U.S. PATENT DOCUMENTS

| | | | |
|---|---|---|---|
| 3,100,762 | 8/1963 | Shockney | 525/358 |
| 3,506,637 | 4/1970 | Makino | 525/358 |
| 3,534,013 | 10/1970 | Wakabayashi et al. | 525/358 |
| 3,632,848 | 1/1972 | Young et al. | 525/358 |
| 4,049,517 | 9/1977 | Adachi et al. | 525/358 |

FOREIGN PATENT DOCUMENTS

| | | |
|---|---|---|
| 1817523 | 7/1969 | Fed. Rep. of Germany . |
| 1186847 | 4/1970 | United Kingdom . |

*Primary Examiner*—Joseph L. Schofer
*Assistant Examiner*—Bernard Lipman

*Attorney, Agent, or Firm*—Alfred D. Lobo; Nestor W. Shust; James R. Lindsay

[57] ABSTRACT

A process is disclosed which permits the photochlorination of poly(vinyl chloride) resin ("PVC"), in an aqueous medium without the use of swelling agents such as are conventionally used. The chlorination reaction proceeds in an aqueous suspension having a high PVC concentration, yet allows the production of essentially uniformly chlorinated poly(vinyl chloride) resin ("CPVC") of excellent quality and uniformity, with a heat distortion temperature ("HDT") of at least 100° C. The transfer of chlorine from the gaseous phase into the aqueous phase, and then into the solid PVC phase, has been accelerated by this process which provides a critical combination of photo-illumination, elevated temperature and elevated pressure in a reactor devoid of oxygen and a swelling agent for the PVC. The "water-chlorination process" of this invention provides a "soak" period, after removal of oxygen from the aqueous PVC suspension, at a soak temperature of about 60° C. to about 75° C., from which the temperature is autogenously "ramped" during photochlorination under pressure to a finishing temperature in the range from about 80° C. to about 120° C. The suspension is exposed to an appropriate level of substantially constant ultraviolet light radiation, and the reactor pressure is maintained substantially constant in the range from about 10 psig to about 100 psig. Chlorination of a PVC starting material having a porosity in the range from about 0.1 cc/g to about 0.7 cc/g and a surface area in the range from about 0.7 m$^2$/g to about 3 m$^2$/g proceeds at a rapid rate.

6 Claims, No Drawings

PROCESS FOR CHLORINATION OF PVC IN WATER WITHOUT USE OF SWELLING AGENTS

CROSS-REFERENCE TO RELATED APPLICATION

This application is a continuation-in-part application of Ser. No. 181,521 filed Aug. 26, 1980 abandoned.

BACKGROUND OF THE INVENTION

Over the past decade, chlorinated poly(vinyl chloride) resin (hereafter "CPVC" for brevity), has moved into the vanguard of vinyl chloride resins because of its unique suitability for rigid and semi-rigid compositions used in extruded pipe, cable jacketing and structural components for buildings. The chlorination of various types of poly(vinyl chloride) resins (hereafter "PVC" for brevity), by different methods is disclosed in the textbooks "Polyvinylchloride and Vinylchloride-Mischpolymerizate," pp. 120-125, Springer, Berlin (1951), by C. A. Schildknecht (1952); and also in U.S. Pat. Nos. 2,426,808, 2,590,651 and 2,996,489 (hereafter "the '489 process," for brevity), inter alia.

The process of the present invention permits the chlorination of PVC in water without the use of swelling agents. The use of swelling agents is taught in the '489 process the disclosure of which is incorporated by reference thereto as if fully set forth herein. The '489 process produces excellent quality CPVC except that the CPVC must be freed from residual swelling agents, as described for example, in U.S. Pat. No. 4,147,859. Also, the CPVC is produced more slowly, and is therefore less economical. As is wellknown in the art, due to the relatively high cost of PVC and the expense of chlorinating the PVC, it is essential that the cost of converting it to CPVC be minimized if the CPVC product is to be an affordable commodity. Hence the intense concentration in the art to develop an improved process.

The art has long recognized the problem of relatively slow chlorination of vinyl chloride resins and much effort has been expended to overcome this problem without sacrificing the quality of the CPVC. For example, U.S. Pat. No. 3,100,762 to Shockney (hereafter "the '762 process" for brevity) describes obtaining faster chlorination than in the '489 process by conducting the chlorination at elevated temperature and pressure in the presence of a swelling agent, but in the absence of photo-illumination. It is taught therein that no catalyst, and particularly no photo-illumination is required under the improved conditions of temperature in the range from about 60° C. to about 100° C., and a reactor pressure in the range from about 20 to about 80 psig, if oxygen is substantially excluded from the reactor, but that inferior chlorinated products are obtained under the foregoing reaction conditions when the chloromethane swelling agent is omitted from the reaction mixture.

The '762 process failed to discover the critical importance of photo-illumination, though it may be stated that the criticality of photo-illumination was overlooked because of the presence of swelling agent, which was deemed essential. Yet, it must also be recognized that the '489 process taught that with photo-illumination in the presence of a swelling agent, temperatures not higher than 65° C. were to be used. The drawbacks of the '762 process were that (a) it required a swelling agent, (b) it maintained constant temperature, and most important, (c) the CPVC product had a heat distortion temperature ("HDT" for brevity), of less than 115° C. It has now been found that with a particular set of process conditions, specified in the instant invention, the swelling agent may be omitted, and at the same time, the quality of the product and the economic attractiveness of the process are improved.

A succession of concerted efforts have been directed to the development of a process for the water chlorination of PVC without the use of swelling agents. For example, U.S. Pat. No. 3,506,637 teaches the use of especially prepared PVC which is chlorinated in the presence of a controlled supply of oxygen in the absence of swelling gents. U.S. Pat. No. 3,534,013 to Wakbayashi et al. also teaches the chlorination of a specially prepared PVC which is prepared by suspension of emulsion polymerized vinyl chloride monomer in the presence of a chlorinated lower alkane.

The relative difficulty with which an aqueous suspension of PVC may be thermally chlorinated is well known, and the product obtained is generally poor in quality and commercially unacceptable for use, esepcially in extruded articles. As disclosed in U.S. Pat. No. 3,632,848 to Young et al., the rate of thermal chlorination of an aqueous suspension of PVC is improved when chlorination is initiated at or above 100° C. and below 140° C. while the suspension of PVC is purged with nitrogen to remove oxygen. This teaching that the critical temperature range for chlorination in the Young et al. process is necessarily above the glass transition temperature ("$T_g$") of the PVC resin has now been found to be injurious to the quality of the CPVC as produced in our process where the temperature at which an aqueous suspension of PVC is chlorinated is no higher than the $T_g$ f the PVC resin, and always remains below the effective $T_g$ of the resin mass during the chlorination. Though the temperature at which chlorination was initiated, in the Young et al. process then necessary under their process conditions, it was so high as to preclude the use of photo-illumination and require the use of a particular metallic ion catalyst, and these conditions adversely affected both the rate and the quality of the CPVC produced, as compared to the rate and quality of CPVC produced by the instant invention.

Another process disclosed in British Pat. No. 1,186,847 to Solvay & Cie teaches chlorination of PVC made by an acetyl peroxide catalyzed reaction. An aqueous suspension of this PVC is stirred continuously and chlorine is blown in under an effective pressure of 2-10 kg/cm$^2$, preferably 4-5 kg/cm$^2$, while continuously raising the temperature of the reaction medium from 35° to 80° C. However, as will be illustrated hereafter, the amount of the chlorine in the CPVC fails to reach 67% even after 10 hours, and the process is too slow to be commercially advantageous.

Still another process, disclosed in U.S. Pat. No. 4,049,517 to Adachi (hereafter "the '517 process" for brevity) teaches varying the amount of ultraviolet radiation (referred to as "light ramping") during the chlorination reaction to control the reaction rate within predetermined limits, thus avoiding the use of a swelling agent for the PVC, but failed to discover the importance of controlling reaction temperature by autogenously increasing it (referred to as "autogenous temperature ramping" because of the self-induced increase of temperature due to the exothermic reaction) if the pressure is maintained at a level in the range from about 10 psig to about 100 psig, or even higher, and, the level of radiation is maintained at a predetermined level.

The importance of autogenous temperature ramping, was overlooked in the '517 process because of the expected relationship of pressure and temperature on gases as evident by their teaching that, even if the amount of the dissolved $Cl_2$ is increased to several times as much as that under atmospheric pressure, the reaction rate under pressure is almost the same as that under atmospheric pressure, when the same quantity of ultraviolet light irradiates a unit amount of PVC. This finding led to the conclusion that $Cl_2$ was not insufficient in the reaction under atmospheric pressure. This conclusion has been found to be contradicted by the process of the instant invention because it is now evident that elevated pressure must be used.

Though each of the aforementioned references recognized the practical onus of a determinedly slow chlorination reaction for PVC, and some indicate the desirability of leaving out the swelling agent, none indicates that the swelling agent could be left out if a particular combination of elevated pressure, ramped temperature commencing at or below the $T_g$ of the PVC resin, absence of oxygen, and a substantially constant amount and intensity of ultraviolet-illumination was employed. No reference teaches that such a combination of process conditions would increase the concentration of $Cl_2$ in the aqueous phase so significantly that the known rate-limiting effect of low $Cl_2$ concentration would be counteracted. Nor was it to be expected that the rate of conversion of PVC to CPVC in the aqueous phase, would be such that, upon the autogenous ramping of temperature in the reactor, the pressure does not get ramped significantly. Further, though it was known that higher porosity of PVC increases the rate of chlorination it was also known that higher pressures produced lower quality, if not unstable, CPVC product. Still further, no reference suggests that a water chlorination of PVC without the use of swelling agents, may provide the rates specified in this invention, without sacrificing the quality, and particularly the heat stability of the CPVC produced.

SUMMARY OF THE INVENTION

It has been discovered that poly(vinyl chloride) resin ("PVC") may be photochlorinated in an aqueous suspension without the use of swelling agents, under elevated pressure and ramped temperature, to yield high quality chlorinated poly(vinyl chloride) resin ("CPVC") at rates not heretofore attainable.

It has more specifically been discovered that PVC may be chlorinated in the absence of any catalyst other than u-v light, without the use of swelling agents for the PVC, by initiating chlorination at or below the $T_g$ of the PVC, preferably above 60° C. and pressure above about 15 psig, provided the reactor is substantially free of molecular oxygen, to obtain excellent quality CPVC having a dynamic thermal stability (hereafter "DTS" for brevity) defined hereinafter, of 12 minutes or higher, at surprisingly high reaction rates. The solvent-free chlorination reaction may be carried out, starting with a heated aqueous suspension of PVC, preferably under pressure at which the suspension is held to soak up $Cl_2$, and photochlorinating the PVC below the $T_g$ of the resin in suspension under pressure, allowing the temperature in the reactor to be autogenously ramped to about a preselected finishing temperature in the range from about 80° C. to about 120° C.

It is therefore a general object of this invention to provide a process for producing CPVC having a density in the range from about 1.50 g/cc to about 1.65 g/cc at 25° C., from about 65% to 72% by weight of chlorine and other commercially acceptable specifications, comprising, (a) introducing an aqueous suspension containing from about 15 to about 35% by wt PVC into a reactor operable under elevated pressure; (b) removing essentially all oxygen from the suspension; (c) introducing chlorine into the reactor until the pressure therewithin is in the range from about 10 psig to about 100 psig; (d) irradiating the PVC with ultraviolet light at a level in the range from about 2 watts to about 50 watts per gallon of suspension to initiate the PVC; (e) ramping the temperature in the range of from about 60° C. to about 120° C. and maintaining this temperature during chlorination; (f) continuing to introduce chlorine into the reactor as the reaction proceeds, so that the pressure in the reactor is maintained substantially constant within said range of pressure; (g) stopping flow of chlorine into the reactor when sufficient $Cl_2$ has been added to produce a desired density of CPVC upon completion of the reaction; and, (h) separating solid macrogranular CPVC from the suspension, and removing aqueous hydrochloric acid present in the suspension of CPVC to obtain the CPVC product.

It is a specific object to chlorinate an aqueous suspension of from about 15% to about 35% by wt PVC having a porosity in the range from about 0.1 cc/g to about 0.7 cc/g, a surface area in the range from about 0.7 m$^2$/g to about 3.0 m$^2$/g, and an inherent viscosity in the range from about 0.5 to about 1.4 at a reaction rate in the range from about 2 to about 5 moles of $Cl_2$/hr/kg of solid PVC macrogranules, so as to obtain a CPVC product which has a heat distortion temperature ("HDT") in the range from about 128° C. to about 170° C. and a Cl content of from about 65% to about 72% by wt.

DETAILED DESCRIPTION OF THE PREFERRED EMBODIMENT

The process of this invention is based on a unique interrelationship of pressure and temperature in the water-chlorination of macrogranular poly(vinyl chloride) resin (hereafter "PVC" for brevity), as this interrelationship affects the dynamic thermal stability ("DTS") of the resulting chlorinated poly(vinyl chloride) resin (hereafter "CPVC" for brevity) produced, and also the rate at which the CPVC is produced. By "DTS" we refer to a test for CPVC when it is compounded in a typical CPVC composition ("test recipe") and used with a Brabender Plastograph mixing head, as will be described in more detail hereinafter. Heretofore, pressure was thought to have no effect on water-chlorinations which were photo-illuminated, that is, were catalyzed by actinic radiation. In reactions which were not photo-illuminated, it was taught that the absence of swelling agents gave inferior results.

Since the prior art has consistently taught the photo-illuminated chlorination ("photo-chlorination") of aqueous suspensions in the presence of a swelling agent such as chloroform, reaction temperature was not raised above 65° C., not only because such swelling agents are low-boiling solvents, but because it was taught that temperatures above 65° C. were detrimental to the production of commercially acceptable CPVC product. By "commercially acceptable" CPVC we refer to resin which is extrudable with the conventional additives under normal conditions presently used for commercial CPVC resins such as Geon ®623 and 625 CPVC. Further, commercially acceptable CPVC forms a glossy coherent, smooth-textured mass upon milling at 400° F. for less than 5 minutes between rollers. Thus the criticality of elevated temperature and pressure in the photo-illuminated water-chlorination of PVC, in the absence of swelling agents was missed. Also missed was the criticality of removal of essentially all oxygen from a suspension of PVC which is to be photo-chlorinated.

The PVC useful in the present invention is the homopolymer of vinyl chloride obtained by either the mass or suspension polymerization techniques, in the form of porous solid macrogranules. The term "macrogranules" is used herein to define a cluster or aggregate of randomly closely packed primary particles of polymer. A handful of macrogranules has the feel of fine sand, and are also referred to as "grains". Macrogranules of PVC which are converted to PCVC will typically have an average diameter in excess of 20 microns, with a preponderance of particles in excess of 50 microns in diameter. A preferred size distribution of each macrogranule is in the range from about 50 to about 500 microns, and conventionally ranges from about 100 to about 200 microns. Each macrogranule is made up of a multiplicity of primary particles each in the size range from about 0.05 micron to about 5 microns, and more typically in the range from about 0.5 micron (5,000 A) to about 2 microns (20,000 A). The bulk of the primary particles are usually submicronic in size, though conditions of polymerization will determine th actual size distribution of both primary particles, and also, macrogranules. Macrogranules can be characterized by their porosity, that is, internal pore volume, and surface area.

The morphology of PVC and CPVC macrogranules, specifically the porosity and surface area, are important properties which determine the physical properties of the polymer after it is molded. Since CPVC is generally derived by the chlorination of PVC, it has been found that the properties of product CPVC may be tailored to a large extent by precisely controlling the conditions under which precursor PVC is polymerized. Such a process is disclosed in U.S. Pat. Nos. 3,506,637, and 3,534,103. With care, the internal morphology of PVC macrogranules may be particularly tailored to permit relatively fast chlorination in a fluidized bed process catalyzed by actinic radiation. Thus, though it is desirable to use highly porous PVC as a starting material to get high chlorination rates, the properties of the CPVC product obtained are generally too poor to meet commercial standards. Therefore, a viable choice of PVC starting material depends in large measure on the characteristics of the process to be used. Since the choice of process must be made with a view to using a particular starting material, it will be evident that this interdependence leaves no obvious choice as to how a "fix" on each selection is to be had.

Most preferred as a starting material is a suspension polymerized PVC having a porosity in the range from about 0.28 to about 0.35 cc/g, a surface area in the range from about 1.0 m$^2$/g to about 3 m$^2$/g, and an inherent viscosity in the range from about 0.95 to about 1.2, that is, having a relatively high molecular weight. The molecular weight of PVC may be related to its inherent viscosity which is determined herein by dissolving 0.24 gram of the resin in 50 ml of cyclohexane while mildly heating and agitating on a solution roller. The solutions are then filtered into an appropriate Ubbelohde viscometer, previously calibrated for the pure solvent. The flow times in seconds for the solutions are determined at four different dilutions to obtain flow data at a number of concentrations. A portion of the original filtered solution is dried to constant weight at 130° C. to obtain a true concentration value. The ratio of the flow time of the solution to the flow time of the pure solvent is a value known as the "relative viscosity." The "inherent viscosity" is defined with respect to relative viscosity as follows:

Inherent viscosity = $n_1$ = $(2.303/C)$ $(\log_{10} n_{rel})$ = $\ln(n_{rel}/C)$ The PVC resin starting material useful in the process of this invention preferably has a high molecular weight such that it possesses an $n_1$ (inherent viscosity) in the range from about 0.5 to about 1.4, the most commonly used PVC resins having an $n_1$ in the range from about 0.8 to about 1.1, or slightly higher.

To produce chlorinated CPVC commercially, and preferably economically, it has been found that a relatively concentrated aqueous suspension of PVC must be chlorinated. But such a relatively concentrated suspension cannot be routinely uniformly chlorinated to get high quality. By "uniformly chlorinated" we describe a CPVC resin having a density which does not deviate more than 20% from the mean density, and a surface area which does not deviate more than 30% from the mean surface area. By "relatively concentrated" we refer to a concentration of about 15 to about 35% by wt of PVC solids in the suspension. Since the physical characteristics of such a relatively concentrated suspension of PVC in water are quite different from those having relatively low concentrations, the problems of chlorination in each are quite different, such factors as viscosity of the suspension, clumping of macrogranules, penetration of ultraviolet light, diffusion of gases into and out of the liquid and solid phases present, inter alia, not lending themselves to extrapolation by known methods. It has been found that a concentration of PVC higher than the specified range results in non-uniform product, while concentrations below 15% yield uniform product, but is not economical. By "aqueous suspension" of PVC we refer to a slurry-like mixture of PVC macrogranules suspended in water. Though, initially the water is not deliberately acidified by the addition of acid, HCl acid is formed during the course of the chlorination and is absorbed in the water. The above-specified concentration of PVC in the suspension is found to yield high output of CPVC for a given reactor volume, without sacrificing the quality of the product, which quality cannot be compromised. This process is particularly directed to a batch process since wholly different considerations enure to the operation of a continuous process.

It is essential for the purpose of obtaining the desired CPVC product that oxygen be removed from the aqueous suspension before chlorination is initiated. This may be effected in any convenient manner. For example, a hot suspension at a temperature in the range from about 60° C. to about 75° C., and containing about 30% PVC may be introduced into a batch reactor and subjected to a vacuum at that temperature so that it boils. Lower temperatures as low as about 20° C. may be employed, but removal of oxygen at such low temperatures is impractical, particularly since the temperature of the suspension is to be raised if it is to be chlorinated by the process of this invention. Removal of oxygen is assisted by agitation of the suspension. After several minutes, depending upon the size of the charge to the reactor, the temperature, and the initial oxygen content of the suspension, it is found that essentially all the oxygen has been removed. The same result may be obtained by sparging an inert gas such as nitrogen through the suspension, again preferably, when the suspension is hot, that is, in the range from 60° C. to 75° C. Any conventional test to determine the concentration of oxygen may be used, and it is preferred to have less than 100 ppm of oxygen remaining in the slurry, the less the better.

During the period when oxygen is removed, the temperature of the suspension may be lowered sufficiently to require heating it to return to a temperature within the range from about 60° to about 75° C. which is the preferred starting temperature range in which the photochlorinated reaction is to be initiated. Such heating as may be required is preferably done after $Cl_2$ is sparged into the suspension from a liquid $Cl_2$ cylinder until the pressure in the reactor reaches about 25 psig, at which point the suspension is saturated with $Cl_2$. It is preferred that this pressure be somewhat higher, that is in the range from about 35 psig to about 100 psig, to get the optimum results, though a pressure as low as 10 psig gives acceptable results. Pressures higher than 100 psig may be employed, though it will be recognized that the cost of equipment for operation at such higher pressures adversely affects the economics of the process. The amount of $Cl_2$ charged to the reactor is determined by the weight loss in the $Cl_2$ cylinder.

After the reactor is pressurized with chlorine, the reactor is preferably brought up to a "soak" temperature in the range from about 60° C. to about 75° C., at which soak temperature the suspension is maintained for a soak period in the range from about 1 min to about 45 mins. The soak period appears to have an unexpectedly beneficial function. It provides $Cl_2$ the opportunity to diffuse into the macrogranules where it will do the most good.

A longer soak period, under pressure, may be used if the soak temperature is lower than 60° C., but a soak period longer than 45 mins is undesirable. An unnecessarily long soak period only defeats a primary object of this water chlorination process, namely to speed up the production of high quality CPVC.

It must be recognized that the relatively high pressure in the reactor, which pressure is preferably maintained constant, also retards the removal of HCl and HOCl from within the macrogranules, and if too high, adversely affects the porosity of the macrogranules to the detriment of the stability of the CPVC product. Again, it is preferred to maintain agitation of the suspension during soaking, though the intensity of agitation may be substantially lower than that preferred during the photo-chlorination step to follow. In fact, the aqueous suspension is preferably kept agitated from the time the preheated PVC suspension is charged to the reactor, until the end, when the CPVC slurry is ready to be dumped.

Irrespective of the length of the soak period and the temperature at which the suspension is maintained during the soak period, it is essential to complete the chlorination reaction under photo-illumination, preferably with ultraviolet light, or the desired conversion of PVC to CPVC product does not occur.

It is feasible to carry out the process of this invention without a soaking step, but such a process is economically impractical. For example, after removing oxygen from an aqueous PVC suspension charged to the reactor, the lights may be turned on prior to introducing the chlorine. Chlorination proceeds at a rate which depends upon the pressure and temperature within the reactor, higher rates being favored at higher temperature and pressure. When pressure and temperature are raised to a level sufficient to give a favorable rate without a soaking step, the uniformity of the CPVC product suffers.

After the "soak" period, the suspension is photo-illuminated with a bank of ultraviolet lights in the manner described in the '489 process, except that it has been found that a relatively high and constant intensity of light should be used, preferably in the range from about 5 watts to about 50 watts per gallon of suspension, if high rates of chlorination with a relatively concentrated suspension are to be obtained. With a preferred high level of photo-illumination, it has been found that reaction rates far greater than in prior art aqueous suspension chlorination processes may be obtained. Most important, the reaction rates may be achieved without a sacrifice in product quality. For example, in contrast with the '762 process for chlorinating a non-photo-illuminated suspension, the chlorination of an aqueous suspension of PVC at 60° C. and 40 psig by the instant process, with a soak period, photo-illumination and "temperature ramping" as will be described hereinbelow, produces a reaction rate of from 0.01–0.04 $min^{-1}$ and a HDT of a test recipe of from 100° C. to 130° C. The reaction rate is computed on the basis of it being a first order reaction, using the formula $$k = -2.303 \, [ln(1-x)]/t$$

where, x is fractional conversion to one chlorine atom per carbon atom, and, t is time (in minutes).

It has been found that carrying out a chlorination reaction under widely fluctuating elevated temperature and pressure while photo-illuminating the suspension does not produce CPVC of adequate quality and stability. It is essential, at elevated pressure, to commence the chlorination reaction at a temperature in the range from about 60° C. to about 75° C., and then to finish the reaction at an even higher temperature generated because of the reaction. No additional heat is required to be added to the reactor because the self-generated heat is sufficient to produce the desired increase in temperature, until it reaches a finishing temperature in the preferred range of from about 80° C. to about 100° C. A finishing temperature as high as 120° C. may be employed if the pressure is high enough. The "finishing temperature" is so termed because it is the temperature at which the chlorination reaction is "finished," that is, a preselected chlorine content in the CPVC has been attained. The precise finishing temperature at which the autogenously ramped temperature levels off, will depend on several factors. It is most preferred to adjust the soak temperature, the mass of resin, and the level of photo-illumination so that the temperature is "ramped" by the self-produced heat of reaction until it levels off at a finishing temperature of about 110° C.

It will now be evident to one skilled in the art that the temperature at which the chlorination occurs should, at all times be below the $T_g$ of the resin in the suspension, whether the resin is a mass polymerized PVC, a suspension polymerized PVC, or a mixture of PVC and CPVC. For example, chlorination of a Geon ® 103EP or 30 PVC resin having a $T_g$ of about 84° C., must be commenced at a temperature below 84° C., though as the reaction progresses, the reaction temperature may be permitted to rise because the $T_g$ of the resin rises as the reaction proceeds to completion. In other words as the reaction proceeds, the $T_g$ of the mixture of remaining PVC and the CPVC formed, continuously increases. This process requires that the autogenously ramped temperature be maintained at all times below the effective $T_g$ of the solid resins. It will also be evident to one skilled in the art, that the problem of maintaining the finishing temperature of the reaction substantially constant at about 90° C. (say) during the exothermic chlorination reaction in a batch reactor requires highly effective heat transfer control or the resin will "burn." This problem is exacerbated as the size of the reactor increases, and is especially onerous in a 2500 gallon, or larger, reactor.

The progress of the chlorination reaction depletes the free chlorine in the reactor and additional $Cl_2$ is introduced into the reactor to maintain the pressure, and to make sure that the desired level of conversion of PVC to product CPVC is attained. The level of conversion is estimated by the amount of $Cl_2$ fed from the $Cl_2$ feed cylinder. It is not desirable to permit the pressure in the reactor to fluctuate more than 20% as the effects of wide fluctuations are reflected in poorer quality CPVC.

When sufficient chlorine is added to the reactor to result in the desired conversion of about 50% conversion (say) of PVC, that is, about 50% of all the vinyl chloride (monomeric) units have been chlorinated with at least one atom of chlorine, or, to result in a desired density of CPVC in the range from about 1.50 to about 1.65 g/cc, more preferably from about 1.536 to about 1.656 g/cc, the flow of chlorine to the reactor is stopped. The suspension is not cooled but dumped to be centrifuged and the CPVC freed from the aqueous phase, after which HCl acid is removed from the CPVC, preferably by neutralizing the CPVC with an aqueous solution of an alkali. The CPVC product is then washed with water to free the CPVC of residual alkali, and dried, all in a conventional manner, except that the temperatures at which the operations are carried out may be in the range from about 60° C. to about 100° C. which are higher than conventionally used.

The chlorinated products of this invention have densities in the range from about 1.5 to about 1.8 g/cc at 25° C., and a HDT in the range from about 128° C. (for 65% Cl content) to about 170° C. (for 72% Cl content). The increase in HDT over conventionally prepared CPVC is ascribed to the probability that there are more 1,1,2-trichloroethylene units in a CPVC molecule than generally present, and which units are not otherwise obtained, at least in an amount significant enough to increase HDT so markedly, even if a conventional photo-illumination is carried out at about atmospheric pressure, with or without a swelling agent, for an extended period of time. When the '489 process is run for an extended period of time, to introduce 1,1,2-trichloroethylene units, an unacceptably high proportion of the CPVC resin is "burned", that is, has obvious discoloration, and poor processing characteristics.

The CPVC prepared according to the present water-chlorination process of this invention has even better chemical resistance, durability, higher softening point, and relatively higher heat stability than prior art CPVCs we have tested which were made in the absence of a swelling agent. The stabilizer-free resin is not degraded when heated in air for at least 10 minutes at 400° F. to 425° F. The chlorine content thereof is 65 to 72 wt percent (unchlorinated PVC contains 56.7% chlorine). The preferred resin has a density within the range of from about 1.536 to about 1.656 g/cc (65 to 72% chlorine), and a HDT (ASTM Test Method D-648-56) of from about 128° C. (for 65% Cl) to 170° C. (for 72% Cl), that is, at least 40° C. higher than the HDT of unchlorinated PVC resins. The most preferred CPVC has a density in the range of from about 1.536 to 1.6 g/cc at 25° C. (65.5 to 69% chlorine) and a HDT of at least 100° C. The CPVC is further characterized by being substantially insoluble in acetone, but completely soluble in hot tetrahydrofuran.

The CPVC is useful in the rigid vinyl field for the manufacture of pipe, ductwork, tanks, appliance parts, etc., especially where the products will handle or contact hot water and other hot, corrosive liquids. It has found particular utility in the production of hot water piping for industrial and domestic use. Ordinarily, a small amount of another resin or rubber, e.g., chlorinated polyethylene, styrene-acrylonitrile copolymer, or chlorinated isobutylene is blended with the chlorinated PVC resin to improve its shock resistance and mechanical processability. The pigments, lubricants and stabilizers well known in the vinyl art also can be incorporated therein. Despite the improved rate at which the CPVC product is formed in the swelling-agent-free process of this invention, the CPVC is uniformly chlorinated, and when compounded with presently used, known materials, no processing disadvantages are evident.

From the foregoing considerations, it will be appreciated that a commodity of commerce must be made in quantity, if it is to be economical, without sacrificing quality. The higher the rate at which the PVC can be chlorinated without sacrificing quality, the more economical the process, provided of course the higher rate can be realized in commercial (plant scale) reactors. Thus, though one would expect to obtain higher rates at higher temperatures (as implemented in the Young et al process), a temperature higher than the $T_g$ of the PVC resin results in commercially unacceptable product in a batch process. Despite prior art teachings as to the importance of the properties of the PVC starting resin, which properties are attributable to the manner in which the PVC resin is formed, our process negates such teachings.

Dynamic Thermal Stability ("DTS") Testing

Product CPVC is blended with stabilizers, plasticizers, pigments and the like, the particular additives being chosen for the particular commercial product (for example, one of those identified hereinabove) for which it is to be used. The blended composition (referred to as a "production compound") must meet several tests, one of the most important of which is the DTS test. This test is conducted with small samples of the production compound, which samples are referred to as "test compounds," using a Brabender Plastograph mixing head.

The recipe for a typical test compound is provided in "Polyether Modifiers for Polyvinyl Chloride and Chlorinated Polyvinyl Chloride," by P. Dreyfuss, M. P. Dreyfuss, and H. A. Tucker, in Advances in Chemistry Series, Number 128, Polymerization Kinetics and Technology, American Chemical Society, 1973. The recipe is as follows;

| Material | Parts by wt |
|---|---|
| CPVC (Geon* 633 × 561) | 100. |

-continued

| Material | Parts by wt |
|---|---|
| Stabilizer (dibutyltin thioglycollate) | 2.5 |
| TiO₂ (Rutile) | 5.0 |
| Lubricant (low mol wt polyethylene) | 1.0 |
| Chlorinated polyethylene | 8.75 |

The ingredients are compounded by milling on a 6 inch diameter mill heated to 400° F. All samples are milled for two minutes after banding on the roll. The test compound is then cooled and cut into chunks for further evaluation.

Using a Brabender Plastograph Measuring Head Model GT545, with Roller Type 5, which is a mixer with irregularly shaped rollers, and the operating procedure set forth in detail by L. L. Blyler and J. H. Daane in "An Analysis of Brabender Torque Rheometer Data" published in Polymer Engineering & Science, 7, 178, March 1967, the mixing bowl temperature is set at 400° F. Then 65 g of the cubed test compound are added to the head and the compound allowed to heat up for 3 mins, after which the mixer is started at 35 revolutions per minute (rpm). The torque of the mixing head and the temperature of the compound are recorded as a function of time. The torque (meter-grams) is plotted as a function of time (minutes) to obtain a torque curve. The DTS time is determined by the intersection of a tangent line through the breakdown point (referred to as "point B"), and the extrapolation of the constant torque part of the curve. The breakdown point B can be read easily from the torque curve and corresponds to the gross decomposition of the compound. The DTS time so obtained is correlatable to the performance of the test compound in commercial production equipment.

The DTS time is affected by the temperature of the compound in the mixing head, higher temperatures decreasing the DTS time exponentially. The DTS time is normalized to a standard temperature of 435° F. by the following formula:

$$\log \theta_c = \frac{435 - T_B}{-81.04} + \log \theta_A$$

where, $T_B$ is the temperature of the compound at breakdown
$\theta_A$ is the raw DTS time, and
$\theta_c$ is the DTS time corrected to 435° F.

The following illustrative examples set forth various runs for the chlorination of a general purpose PVC resin, some of which runs are made according to prior art processes. Unlike prior art processes for chlorination of PVC with swelling agents, the process of this invention is not limited to using suspension polymerized PVC, but may equally use mass polymerized PVC.

EXAMPLE 1

Chlorination Using the '489 Process

An externally jacketed 2500 gallon (gal) reactor, equipped with a pitch-bladed turbine, is charged with 1450 gal of water and 2700 pounds (lb) of a general purpose PVC such as Geon ® 103 EP resin (inherent viscosity=1.0) in the form of a suspension or slurry which is previously heated to about 52° C. in a slurry charge tank. The reactor, which preferably is a pressure vessel suitable for operation at pressures up to about 100 psig, is tightly closed so that it can be slightly pressured at least up to about 6 lbs/in² gauge (psig). To the warm suspension is added 675 lb of chloroform and the suspension is agitated to ensure uniform distribution of the chloroform throughout the reactor. Thereafter, while the suspension of PVC is being agitated, chlorine is sparged into the reactor directly below the turbine, and four (4) 4500 watt ultraviolet lights immersed in the suspension are turned on to initiate and maintain the chlorination reaction.

Cooling water is circulated through the jacket of the reactor to maintain the temperature of about 52° C. Chlorine is continued to be charged to the reactor until the pressure is about 6 psig, and the rate of chlorine charged to the reactor is controlled so that the pressure is maintained, and also the rate of chlorination as estimated from the heat duty of the cooling jacket. When a total of 1500 lb of chlorine has been charged, as determined by the loss in weight of a chlorine cylinder on a weighing scale, the chlorine feed is shut off. The amount of chlorine to be charged is calculated so as to yield a CPVC product having a predetermined density upon completion of the reaction, and in this example, a density of about 1.56 g/cc and a chlorine content of about 66.8%.

The chlorination reaction continues until substantially all the free chlorine is reacted, this point being evidenced by a slight vacuum appearing on the reactor's pressure gauge. The lights are turned off, and after about 15 mins, the reactor is opened to the atmosphere and its contents dumped. The time for completion of the reaction, from the time the reactor is charged with heated PVC suspension, to the time the reactor is dumped, is about 8 hours. The CPVC reaction product is recovered from the dumped suspension, and the HCl acid adhering to it is removed either by steam stripping, or by neutralizing with alkali. The HCl-free CPVC is then washed to free it from dissolved salts, and dried. Upon testing in a typical CPVC compound recipe such as that given hereinabove, the CPVC product is found to have a DTS of 11 mins. that is, $\theta_c = 11$ mins.

EXAMPLE 2

Chlorination Using the '762 Process

In the same 2500 gal jacketed reactor used in Example 1 hereinabove, a suspension of 2700 lb of Geon ® 103 EP PVC resin and 1450 gal of water heated to about 60° C., is agitated while 675 lb of chloroform are added. After about 15 mins, chlorine is sparged into the reactor as in Example 1 hereinbefore, until 1500 lb of chlorine are charged. The lights are not turned on. The reaction is initiated, and chlorine is continued to be fed to the reactor so as to maintain a pressure of 80 psig. The chlorine feed is then shut off and the reaction allowed to go to completion. As before, cooling water in the jacket maintains the temperature of the reaction at about 60° C. The time for completion of the reaction from the time the reactor is charged with the heated suspension until the time the reactor is dumped, is over 9 hours. The CPVC product it recovered and tested in an analogous manner to that described in Example 1 hereinabove. The CPVC product produced according to the '762 process is found to have a DTS of about 9 mins, which is deemed unsatisfactory for a commercial CPVC composition such as that used for the extrusion of pipe, ($\theta_c = 9$ mins).

EXAMPLE 3

Chlorination Using the Solvay Process With Oxygen Removal

An externally jacketed 200 gal reactor, equipped with a flat-bladed turbine made of titanium, is charged with 1204 lb of water into which 250 lb of Geon® 30 (a general purpose successor resin to 103EP) are mixed. The general purpose resin is produced by a suspension polymerization process in which an acyl peroxide initiator is one of the initiators used. A ratio of water:polymer=4.8 is used, rather than 3.0, to provide adequate agitation with the turbine so as to facilitate chlorination. The temperature of the suspension is raised to 35° C. at which nitrogen is bubbled through it for one-half hour to remove oxygen. Essentially all the oxygen is removed because it is now known that the presence of oxygen in the suspension retards the rate of chlorination. $Cl_2$ is sparged into the suspension from a feed cylinder on a weigh scale until the pressure within the reactor is 35 psig (about 2.5 kg/cm$^2$), which is the set operating pressure for the reactor, and this pressure is maintained while the temperature of the suspension is allowed to increase to 80° C. at which the contents are maintained. No u-v lights are turned on. Knowing the solubility of $Cl_2$ in water as a function of temperature and pressure, we calculate the amount of Cl reacted with the PVC as a function of the amount of $Cl_2$ fed from the feed cylinder. These calculations are corroborated with analytical data from experimental runs. When the Cl content of the CPVC reaches 67%, the $Cl_2$ feed is shut off. The results set forth hereinbelow were obtained with two runs using the Solvay process modified to incorporate oxygen removal, compared with a third run in which the process of this invention is used. Run 1 was terminated at the end of 10 hr, and run 2 was terminated after 7 hr since, at the rate of chlorination near termination, addition of Cl was too slow, as is evident from run 2. The Cl content recorded herebelow is determined analytically.

| Run | Temp. °C. | u-v light watts/gal | sp. gr. of CPVC | % Cl in CPVC | Time (hr) |
|---|---|---|---|---|---|
| 1 | 30-85 | 0 | 1.5286 | 64.55 | 10 |
| 2 | 30-85 | 0 | 1.5214 | 64.11 | 7 |
| 3 | 62-90 | 13.1 | 1.567 | 67.0 | 3 |

It is evident that even after 10 hr the Cl content of the CPVC fails to reach 65% in runs 1 and 2. Since the rate of chlorination decreases exponentially as the Cl content of the resin increases, the time to reach 67% with the Solvay process will be longer than recorded.

EXAMPLE 4

Chlorination Using the Young et al. Process

In the same externally jacketed 200 gal reactor, equipped with a flat-bladed turbine made of titanium, is charged 1204 lb of water into which 250 lb of Geon® 30 are mixed. Again, a ratio of water:polymer=4.8 is used, for the same reason as in Example 3 hereinabove. The temperature of the suspension is raised to 100° C. and the suspension is allowed to boil for one-half hour, sufficiently long for essentially all the gases, including oxygen, dissolved in the water to be expelled. $Cl_2$ is sparged into the suspension from the feed cylinder on the weigh scale until the pressure within the reactor is about 35 psig, and this pressure is maintained while the temperature of the suspension is maintained at 100° C. No u-v lights are turned on. The flow of $Cl_2$ is shut off when it is calculated that the Cl content of the CPVC has reached 67% by wt. The following results are obtained with a run (No. 4) compared with a second run (No. 5) in which the process of this invention is used. The Cl contents set forth hereinbelow are determined analytically.

| Run | Temp. °C. | u-v light watts/gal | sp. gr. CPVC | % Cl in CPVC | Porosity cc/g | DTS* | Time (hr) | Fusion |
|---|---|---|---|---|---|---|---|---|
| 4 | 100 | 0 | 1.5672 | 67.0 | 0.276 | 9.7 | 2.5 | poorly fused, crumbly |
| 5 | 62-90 | 13.1 | 1.567 | 67.0 | 0.290 | 10.7 | 3.0 | well-fused, glossy |

*adjusted to 435° F.

We know of no PVC available which has a $T_g$ greater than about 85° C., and it is clear that the 100° C. temperature at which the chlorination is initiated is too high, as evidenced by both the decrease in porosity compared with a commercially acceptable resin as well as the poor fusion characteristics on a mill. Though the high temperature accelerates the reaction, the poorly fused, crumbly mass obtained on the mill indicates the CPVC will not extrude satisfactorily. In contrast, the claimed process gives a well-fused glossy mass of CPVC which is smooth textured, usually within 2-3 mins on the mill between 400° F. rollers.

EXAMPLE 5

Solvent-free Chlorination with Temperature Ramping

In the same 2500 gal jacketed reactor used in Examples 1 and 2 hereinabove, a suspension of 2700 lb of Geon® 103EP PVC resin and 1450 gal of water heated to 62° C., is subjected to a vacuum drawn on the reactor until the suspension boils, at least near its surface. The vacuum and agitation are maintained until substantially all molecular oxygen is driven out of the suspension. A typical vacuum condition is an absolute pressure of 164 mm mercury at 62° C. which is held for about 15 mins. The vacuum is then broken by sparging chlorine under the turbine so that it is quickly and thoroughly dispersed in the suspension, and the chlorine is continued to be fed to the reactor until the reactor is pressured to 33 psig, which is to be the reaction pressure.

The reactor is held at 62° C. and 33 psig for a soak period of about 30 mins, after which the 4 ultraviolet lights (4500 watts each) are turned on. Chlorination commences at a high rate as evidenced by the rise in temperature of the suspension. The pressure in the reactor is maintained by feeding chlorine on demand until 1450 lb of chlorine are fed, being careful not to allow too steep a temperature rise which has a tendency to produce localized burning of the CPVC resin formed by the reaction. When the temperature of the suspension is autogenously ramped to about 95° C., the reaction is allowed to go to completion at this finishing temperature which is maintained by providing the necessary cooling water in the reactor's jacket. The chlorine supply is then shut off but the lights are left on so that most of the chlorine reacts with the PVC resin. The lights are turned off when the pressure drops below atmospheric, and preferably to a sufficient vacuum so that very little free chlorine is left in the reactor.

The contents of the reactor are then dumped, neutralized, filtered, washed and dried, as is conveniently done. The time for completion of the reaction, from the time the reactor is charged with the heated suspension of PVC, to the time when the reactor is dumped, is less than four hours. The resulting CPVC is substantially the same in appearance as the CPVC produced as described in Example 1, but testing of the CPVC produced by temperature ramping under pressure, gives a DTS above 12 mins. Additional runs made in an analogous manner, under temperatures in the range from above 65° C. to about 120° C. and pressures in the range from about atmospheric to about 100 psig provide a CPVC product with excellent DTS. In particular, runs made at pressures above about 30 psig and at temperatures above 65° C. yield a product having a DTS above 12 mins. without any loss of other desirable qualitites of the CPVC product.

It will be evident to one skilled in the art that the rate of the chlorination reaction is not a straight line function, but exponential, and that this rate will depend not only on the temperature, pressure, photo-illumination, concentration of chlorine in the suspension, and the like, but also to some extent upon the porosity and other physical characteristics of the PVC to be chlorinated. Further, the rate will be different depending upon the particular characteristics of the agitation provided and the size of the reactor, other factors being the same. The rate of the reaction is best set forth as an average rate as determined over the period during which the reactor is closed after it is charged and then readied for the chlorination reaction, until the reaction is deemed complete, that is, the desired amount of Cl has been introduced into the PVC starting material to give the desired CPVC. It will be equally evident that the time for the reaction to yield a CPVC having a greater Cl content than 67% (say 69%) will be much longer because the rate at which the additional 2% Cl can be introduced is much less than that at which the 67% CPVC was formed.

The average rate of the autogenously temperature ramped reaction of this invention, to produce 67% Cl CPVC, is in the range from about 1 mole of $Cl_2$/hr/kg of PVC to about 9 moles $Cl_2$/hr/kg of PVC, the highest rates being obtained in small 2-liter laboratory batch reactors.

The average rate in a 200 gal reactor with the process of this invention is in the range from about 2 to about 5 moles of $Cl_2$/hr/kg of PVC, indicating that the reaction to produce the 67% Cl CPVC may be completed within as little as 2 hrs without sacrificing good quality.

The average rate in which the claimed process can be carried out in a 2500 gal or 5000 gal batch reactor, is in the range from about 1.6 to about 4 moles of $Cl_2$/hr/kg of PVC for 67% CPVC and still yield commercially acceptable product.

We claim:

1. A process for producing chlorinated poly(vinyl chloride) resin having a density within the range from about 1.50 to 1.65 g/cc at 25° C., comprising:
    (a) introducing an aqueous suspension of poly(vinyl chloride) containing from about 15 to about 35% by wt poly(vinyl chloride) into a reactor operable under elevated pressure;
    (b) removing essentially all oxygen from said suspension and reactor;
    (c) introducing chlorine into the reactor until the pressure therewithin is in the range from about 10 psig to about 100 psig;
    (d) soaking the poly(vinyl chloride) under said pressure for a period of from about 1 minute to about 45 minutes at a "soak" temperature in the range from about 60° C. to about 85° C.;
    (e) irradiating the poly(vinyl chloride) with ultraviolet light at a relatively high and constant intensity in the range from about 2 watts to about 50 watts per gallon of said aqueous suspension;
    (f) increasing the temperature of said suspension by at least 5° C. autogenously from said soak temperature to a finishing temperature in the range from about 80° C. to about 120° C.;
    (g) maintaining a finishing temperature in the range from about 80° C. to about 120° C. during chlorination;
    (h) continuing to introduce chlorine into the reactor as the reaction proceeds, so that the pressure in the reactor is maintained substantially constant within said range of pressure;
    (i) stopping flow of chlorine into the reactor when sufficient chlorine has been added to produce a suspension of chlorinated poly(vinyl chloride) having said density upon completion of the reaction; and,
    (j) separating solid macrogranular chlorinated poly(vinyl chloride) from said suspension of chlorinated poly(vinyl chloride) product characterized by having a heat distortion temperature measured by ASTM Test Method D648 which is in the range from about 100° C. to about 135° C.

2. The process of claim 1 wherein said poly(vinyl chloride) resin has a porosity in the range from about 0.1 cc/g to about 0.7 cc/g, a surface area in the range from about 0.7 $m^2$/g to about 3 $m^2$/g, and an inherent viscosity in the range from about 0.5 to 1.5.

3. The process of claim 1 wherein said poly(vinyl chloride) resin is suspension polymerized, has a porosity in the range from about 0.2 cc/g to about 0.6 cc/g and a surface area in the range from about 1.0 $m^2$/g to about 1.5 $m^2$/g.

4. The process of claim 1 wherein said poly(vinyl chloride) resin is mass polymerized, has a porosity in the range from about 0.1 cc/g to about 0.4 cc/g, and a surface area in the range from about 0.8 $m^2$/g to about 1.0 $m^2$/g.

5. The process of claim 3 wherein said finishing temperature is in the range from about 80° C. to about 100° C.

6. The process of claim 4 wherein said finishing temperature is in the range from about 80° C. to about 100° C.

* * * * *